April 14, 1936.  G. R. RICH  2,037,340
COMPOSITE METAL ARTICLE OF MANUFACTURE
Filed Oct. 8, 1935
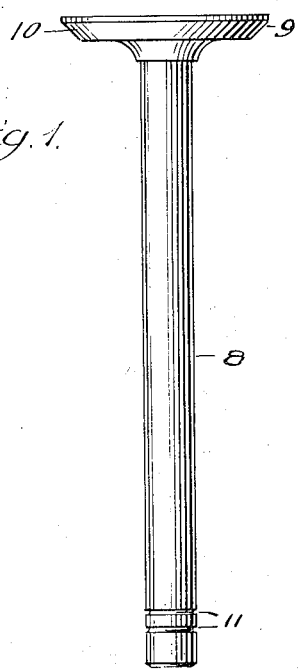
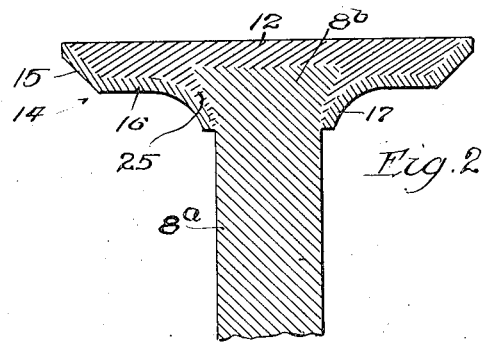
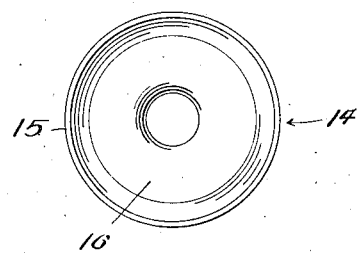
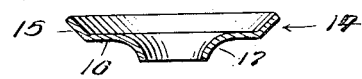
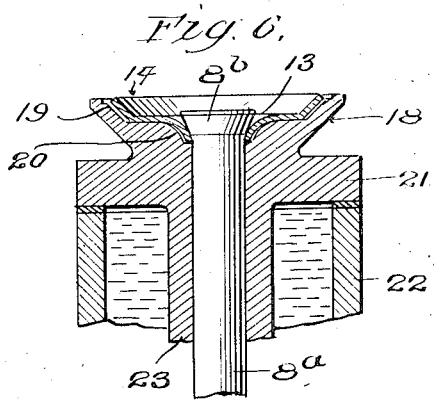
Inventor:
George R. Rich,
by Charles O. Shurey
his Atty.

Patented Apr. 14, 1936

2,037,340

UNITED STATES PATENT OFFICE 2,037,340

COMPOSITE METAL ARTICLE OF MANUFACTURE

George R. Rich, Battle Creek, Mich.

Application October 8, 1935, Serial No. 44,130

4 Claims. (Cl. 123—188)

This invention relates to composite metal articles of manufacture, and in its present form the invention has been illustrated in connection with the motor valve of an internal combustion engine.

One of the objects of the present invention is to provide a composite metal article of manufacture, such as a motor valve having practically all the beneficial characteristics of the more expensive valves, and which may be produced at much less cost. Another object is to provide a composite metal valve composed of metals best suited for the particular parts of the valve which they comprise.

Another object is to produce a composite metal valve having a relatively hard insert in its head and a relatively soft seating face, whereby the seating face may readily and quickly wear in to fit perfectly on the seat in the motor block, when the motor has been initially operated for a short time.

Another object is to provide a composite metal valve which may be readily fabricated without the use of cumbersome, expensive machinery such as power hammers that are ordinarily employed to give shape to a single piece poppet valve.

Other objects and advantages will appear in the course of this specification, and with said objects and advantages in view, this invention consists in the several novel features hereinafter fully set forth and claimed.

The invention is clearly illustrated in the drawing accompanying this specification, in which:—

Fig. 1 is a side elevation of a finished valve embodying a simple form of the present invention;

Fig. 2 is an enlarged, fragmental, central, vertical section, through the valve;

Fig. 3 is a plan of a certain cup used in the construction of the valve;

Fig. 4 is a central, vertical, cross-section through the cup;

Fig. 5 is a fragmental, side elevation of a rod which forms the stem of the valve; and Fig. 6 is a central, vertical, fragmental section through a certain water jacketed form in which the valve is fabricated and showing the cup and a fragment of the rod in place in the form before the insert is cast in the cup.

Referring to said drawing and first to Fig. 1, the reference character 8 designates a valve stem and 9 the head of a finished motor valve constructed in accordance with the present invention. As is customary, the head is provided with a tapered seating face 10, and the stem is provided with the usual grooves 11 to retain the washer upon which the valve spring seats.

Referring now to Figs. 3 to 5, inclusive, which illustrate the several parts which comprise the completed valve, the stem is in the form of a rod $8^a$ of required length, composed of any desirable steel and cut from a steel rod of slightly greater diameter than the diameter of the finished stem. One end of the rod is upset to form a head $8^b$ desirably of tapered form.

Upon the headed end of the rod $8^a$ is placed a steel stamping, preferably in the form of a shallow cup 14, desirably composed of a steel alloy, containing chromium and nickel, or other suitable alloying metal. The cup has a rim 15 which flares upwardly and outwardly from the margin of the web portion 16 of the stamping at an angle of approximately 45 degrees and provides the seating face 10 of the valve head. Projecting down from the web portion 16, is a tapered or bell-shaped neck 17, centrally apertured to receive the upper end of the rod $8^a$. The rod fits fairly well in the aperture, and the taper of the head $8^b$ is somewhat less than the taper or convergence of the neck 17, whereby an annular, substantially V-shaped groove 13 (see Fig. 6) is left between the head and neck, the purpose of which will be presently explained. An insert 12 (see Fig. 2) desirably composed of electric furnace iron, and as a preference, containing approximately eight to eight and one-half per cent nickel and three to four per cent chromium, with a carbon content of approximately 2.75 to 3.25 is employed. These proportions may, however, be varied within given limits so as to increase or decrease the hardness of the insert. The insert is deposited in the cup by heating a portion of a stick of electric furnace iron with an electric arc-welding tool, and by reference to Fig. 2, it will be seen that the insert is fused or blended with the entire internal surface portion of the cup and with the entire external surface portion of the head of the rod, the cast metal which flows into the V-shaped groove 13 forming an annular fin 25, whereby an integral structure is provided, wherein the possibility of separation of one part from the other is entirely eliminated.

In fabricating a valve embodying the present invention, the cup and rod are first assembled, as seen in Fig. 6, and placed in a suitable form 18 which is adapted to support the cup with the rod suspended by the neck thereof. The form 18, desirably, is made of copper, owing to its high efficiency for absorbing and radiating heat. In its upper face is formed a countersink 19, the internal side face of which flares approximately at the same angle as the tapered rim of the cup. The diameter of the countersink is slightly greater than that of the cup, so as to leave a slight amount of clearance between the rim of the cup and the internal side face of the countersink. The bottom face of the countersink is formed with a central, upwardly flaring or bell-shaped depression 20 to receive the neck 17 of the cup, and the diameter of the depression is also made slightly greater than that of the neck to leave a slight clearance between the side of the neck and the adjacent side of the depression.

The only surface contact between the cup and form is made between the flat web or bottom 16 of the cup and the flat bottom face of the countersink. The form 18 has a flange 21 which forms the top of a water jacket 22, through which cool water is circulated to absorb heat from the form and valve structure. The form is provided with a centrally disposed sleeve 23 which projects down from the flange 21 to receive the rod 8ª of the valve structure, and said sleeve is surrounded by the cooling water in the jacket. The water jacketed form 18 forms the subject matter of a separate application for patent filed by me on the eighth day of October, 1935, under the Serial Number 44,131.

The casting and fusing of the insert with the cup and rod is done with an electric arc-welding apparatus of commercial form, in which the arc-welding tool is manipulated by hand in performing the casting and fusing operation. In casting and fusing an insert to the cup and head of the rod, one end of a metal stick of electric furnace iron of the desired composition is held upon the top of the head 8ᵇ and the point of the electric arc-welding tool is brought down upon the stick and a portion of the latter is melted away therefrom and flowed upon the top of the head 8ᵇ and the cup. The point of the arc-welding tool is then moved around above the web portion of the cup, thereby flowing the molten metal around in the cup so that it contacts with all of the exposed surface portions of the cup and head. Some of the molten mass flows down into the V-shaped groove 13 and fills this space. The process is continued for a few seconds or until the contacting surface portions of the cup 14, head 8ᵇ and insert 12 are completely fused or blended together, so as to form an integral mass. This is possible because the heat generated by the electric arc-welding apparatus raises the temperature to about six thousand degrees. However, with the use of the water cooled copper form, there is no likelihood of the external surface of the cup becoming deformed.

It is to be observed that an insert, composed of the alloy above set forth, when cast upon the cup and head, is very hard and retains its hardness when subjected to the high temperatures developed in internal combustion engines. The insert is very stiff and therefore serves to retain the shape of the valve head. The cup having a less percentage of nickel and chromium content than the insert is not so hard as the insert and by reason of this fact, the tapered seating face readily works itself in when the valve is initially operated in an internal combustion engine.

Valves constructed in accordance with the above described method, require very little machining and it has been found that practically all that is required to put the blank into shape is to grind the several parts thereof to size.

I claim as new and desire to secure by Letters Patent:

1. A composite metal article of manufacture, comprising a shallow cup like, relatively soft and thin steel stamping of substantially uniform thickness throughout and, having a bottom, an upwardly flaring rim and a downwardly projecting centrally apertured neck, a steel rod protruding through said neck into the interior of the cup, and having a head located within the confines of the stamping and having a part disposed in the hollow of the neck and spaced from the internal face thereof, and a cast metal insert in the cup having an annular fin contained in the space between the head of the rod and the neck of the stamping, said insert being blended with the head of the rod and with the bottom, neck and rim of the cup.

2. A composite metal poppet valve, comprising a shallow relatively soft and thin steel alloy cup of substantially uniform thickness throughout and having a bottom, an upwardly flaring rim, serving as a relatively soft seating face for a poppet valve, and a downwardly projecting centrally apertured neck, a steel rod protruding through said neck into the interior of the cup, and having a tapered head on its upper end located entirely within the confines of the cup and having a part disposed in the hollow of the neck and spaced from the internal face thereof, and a cast metal insert in the cup covering the head of the rod and having an annular fin contained in the space between the head of the rod and the neck of the stamping, said insert being fused to the headed end of the rod and to the bottom, neck and rim of the cup, thereby providing a valve head having a relatively soft seating face backed by a relatively hard insert.

3. A composite metal poppet valve, comprising a relatively soft and thin shallow steel alloy cup of substantially uniform thickness throughout and having a bottom, an upwardly flaring rim, serving as a seating face for a poppet valve, and a downwardly projecting neck, a steel rod having one end entering said neck and formed with a tapered head located in the neck, and a cast metal insert having an annular fin contained in the space between the tapered head of the rod and the neck of the cup, said insert being welded to the head and bottom, neck and rim of the cup.

4. A composite metal valve comprising a relatively soft and thin sheet metal cup of substantially uniform thickness throughout and having a centrally apertured bottom wall formed with an upturned tapered rim on one side and with a downturned centrally disposed neck on the opposite side, which converges downwardly to the aperture, a steel stem substantially fitting and extending through said aperture, said stem having a tapered head within the cup, the side of which is spaced from the adjacent side of the neck to provide a metal receiving annular space, and a cast metal insert composed of electric furnace iron containing nickel and chromium, said insert being disposed upon said head and upon said cup and in the aforesaid annular space, and said cast metal insert, cup and head being blended together throughout.

GEORGE R. RICH.